June 5, 1956     T. W. WINSTEAD     2,748,401
EXTRUDED FLEXIBLE AND HOLLOW ARTICLES
AND METHOD OF MAKING SAME Filed June 30, 1952     2 Sheets-Sheet 1

INVENTOR
THOMAS W. WINSTEAD

BY
ATTORNEYS

June 5, 1956

T. W. WINSTEAD 2,748,401

EXTRUDED FLEXIBLE AND HOLLOW ARTICLES
AND METHOD OF MAKING SAME

Filed June 30, 1952

INVENTOR
THOMAS W. WINSTEAD

BY
*Semmes Keegin, Robinson & Semmes*
ATTORNEYS

United States Patent Office 2,748,401
Patented June 5, 1956

---

2,748,401

EXTRUDED FLEXIBLE AND HOLLOW ARTICLES AND METHOD OF MAKING SAME

Thomas W. Winstead, Baltimore, Md., assignor to Hedwin Corporation, Baltimore, Md., a corporation of Maryland Application June 30, 1952, Serial No. 296,402

6 Claims. (Cl. 9—21)

This invention relates to inflatable articles of the general class which includes pneumatic floats, mattresses, cushions and the like, and more particularly to such an article and the method of making the same as a unitary structure from a one piece, extruded thermoplastic blank.

Articles of the above type have been made of fabric, natural and synthetic rubber, flexible plastic sheet material and combinations of these. They usually consist of a flattened, closed envelope having internal partition walls which divide the envelope into a number of cell-like air chambers and serve to maintain the desired inflated shape of the envelope.

Heretofore, such articles have been fabricated by sewing, gluing, vulcanizing or otherwise securing together several pieces or blanks of sheet material cut to proper shape. The methods of fabrication heretofore proposed, however, have proved costly both because of the number of necessary operations, expensive dies, jigs, etc., and also because of the amount of waste in scrap resulting from cutting the several blanks. Further, the results have not proved entirely satisfactory, particularly because of the inherent weakness at the junctures of the several joined blanks.

Thermoplastic materials have been extruded into tubes of various cross sectional shapes, both completely open and having various arrangements of longitudinal cells. Heretofore, however, such extrusion has been restricted to tubular bodies of relatively small cross section because of practical die size limitations. Thin-wall, hollow bodies having cross sectional dimensions of a size, for example, of a float or air mattress have been considered too large to produce practically by extrusion methods.

Accordingly, the chief object of the present invention is to provide an improved inflatable float or similar substantially flat, hollow body and a method of making the same which will obviate all of the disadvantages characterizing known floats and methods of forming the same.

Another important object of this invention is to provide an article of the above character having a relatively large transverse dimension made from a one piece blank extruded in a novel, substantially collapsed condition from a relatively small extrusion die.

Still another important object of the invention is to provide a float or similar hollow body of flexible plastic or other material adapted for inflation and which is divided into a number of juxtaposed tubular cells by partition walls or webs, the outer wall of the body being formed in one piece and the webs integrally formed as a unitary part with the outer wall.

A further important object of the invention is to provide a method of extruding blanks to make flexible floats or similar hollow bodies adapted for inflation and having a relatively wide transverse dimension, in which the blank is extruded from a relatively small extrusion die in the form of a number of juxtaposed, continguous, flattened tubes, a portion of the wall of each tube forming the corresponding portion of the wall of the tube contiguous therewith.

A further important object of the invention is to provide a method of making inflatable floats or similar hollow bodies in which thermoplastic material is extruded as a continuous unitary piece consisting of juxtaposed contiguous tubular cells, blanks of desired length are cut from the extruded piece and formed into closed envelopes by heat sealing the ends of the blank.

Another important object is to provide a float, etc. of the type described characterized by the absence of joints or seams throughout except one at each end of the float and including means enabling the free passage of air between the respective cells of the float.

Other objects and advantages of the present invention will become apparent during the course of the following description:

In the drawings, I have shown several embodiments of the invention. In these showings:

Figure 1:
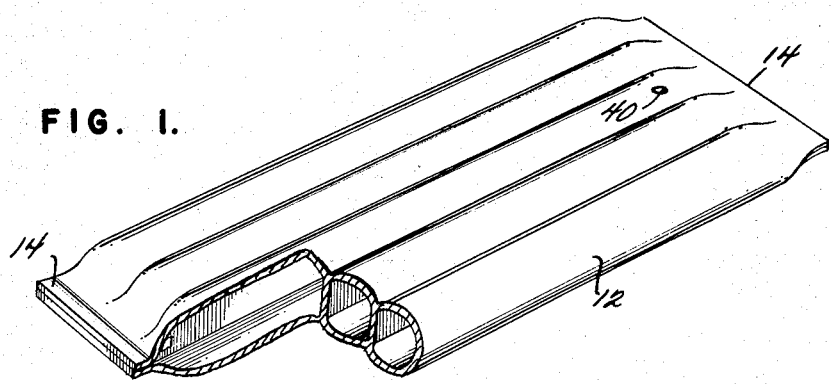
Figure 1 is a perspective view partially broken away of a float formed in accordance with the present invention.

In general, the invention comprises an inflatable float or similar hollow, substantially flat body having a relatively wide, normal, transverse dimension, made from a one-piece blank extruded in a collapsed condition materially less than the normal width of the body. The blank is extruded in a continuous strip of juxtaposed, continguous tubes, a portion of the wall of each tube forming the corresponding portion of the wall of the tube adjacent thereto. These common portions of the tube walls constitute longitudinal webs which, in the finished article, serve to restrict its inflated thickness and define its flattened shape.

The remaining portion of the tube walls, which in the finished article constitute the outer wall of the body, in the extruded blank are pleated, or folded upon themselves, either outwardly with respect to the webs or inwardly therebetween, whereby the blank, as extruded, has a collapsed bellows-like cross sectional configuration. By so extruding the blank, a body formed therefrom having a relatively wide transverse dimension, may be readily extruded from a relatively small size extrusion die. By way of example, a float having a cross sectional size of 6 x 24 inches and a wall thickness of about .020 inch may be extruded from a 5 inch die.

This extruded strip is cut transversely into blanks of appropriate length for the article to be formed therefrom, expanded transversely, and the ends closed by bringing together and fusing the outer walls at opposite ends of the blank by the application of heat and pressure. The article may be inflated prior to finally closing but preferably a suitable filling valve is affixed by means of which it may subsequently be inflated.

Referring to the drawings, numeral 12 designates a float of the type used as an amusement device in surf bathing, as a mattress for lounging or sleeping, etc. which comprises a rectangular hollow envelope having its ends closed by heat sealing as at 14. The envelope is divided into a plurality of longitudinally extending cells 16 by means of parallel, longitudinal webs 18 extending from the top wall 20 to the bottom wall 22 of the envelope and formed integrally with the top and bottom wall. The cell walls or webs 18 serve to maintain the desired inflated shape of the float 12 and it will be noted that the heat sealed ends 14 prevent lateral contraction of the float 12 when in the uninflated condition.

Figure 6:
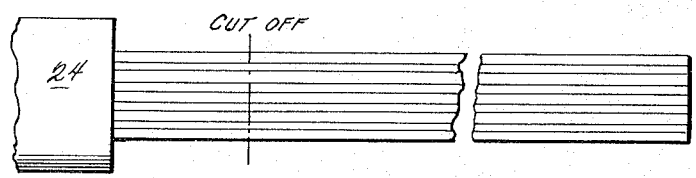
Figure 6 is a plan view of the discharge end of an extrusion die showing a blank being extruded therefrom from which a float may be fabricated according to the present invention.

The blank from which the float is made is cut from a piece extruded as a unitary structure and in a transversely collapsed condition as diagrammatically shown in Figure 6. Any suitable, flexible plastic material may be used but a thermoplastic compound with sufficient plasticizeer incorporattd therewith to give desired flexibility is preferable. The extrusion machine may be of conventional design of a type such as used for extruding rubber wherein the thermoplastic compound is continuously fed, first through a beating chamber and thence through a nozzle or die having an orifice to give the extruded material its desired shape.

Figure 7:
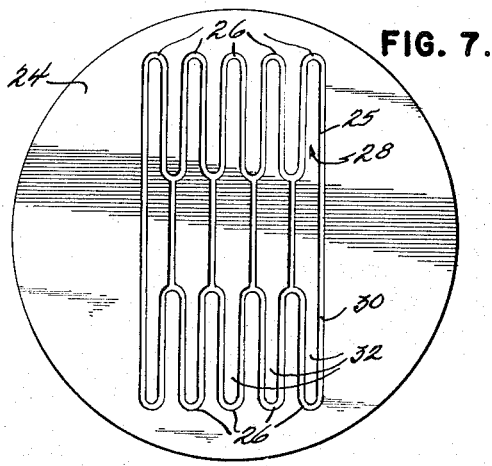
Figure 7 is a view in elevation of the face of an extrusion die for extruding blanks for making a float having an inflated cross-section as shown in Figures 1 and 2.

One form of nozzle is shown in Figure 7 and comprises a die portion 24 which forms the exterior shape of the extruded blank, and a mandrel portion 28 which forms the interior shape. The die 24 is formed with an aperture 25, one pair of opposed faces of which are corrugated to form a series of indentations or grooves 26. The other opposed pair of faces of the aperture 25 may be straight and parallel.

The mandrel portion 28 has a cross-sectional configuration similar to that of the die aperture 25 but is somewhat smaller, being spaced from the wall of the apertures a distance corresponding to the outer wall thickness of the blank, and defines with the aperture an extrusion orifice 30. The mandrel preferably comprises a group of juxtaposed parallel fins 32 corresponding in number to the number of opposed grooves 26. The opposite edges of the fins fit within the opposed grooves and the center sections of the fins are somewhat thickened and spaced apart a distance corresponding to the desired thickness of the webs 18 of the blank.

It will be readily apparent (Figure 6) that material extruded through the orifice 30 will be in the form of a series of juxtaposed, flattened tubes, each tube joined to the one adjacent thereto by a common wall. In other words, the blank formed by extrusion through the orifice 30 will be in the form of a tubular body divided longitudinally into a single row of juxtaposed cells by longitudinally extending cell walls joined respectively to the top and bottom of the tube.

Figure 2:
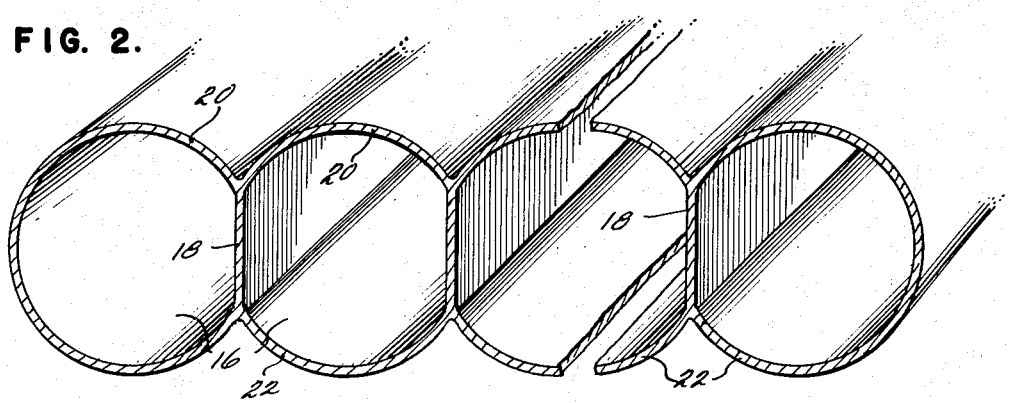
Figure 2 is a cross sectional view in fragmentary perspective thereof.
Figure 8:
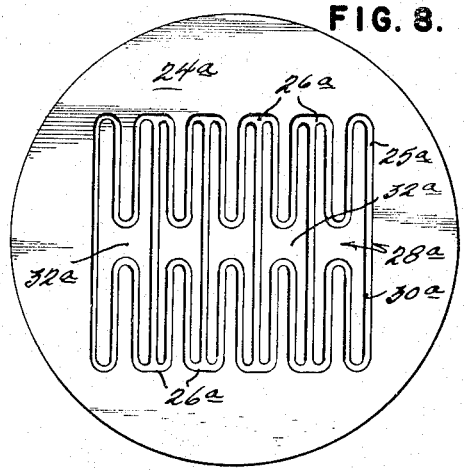
Figure 8 is a view similar to Figure 7 in which a die for fabricating blank having modified cell dimensions is shown.

The tubular body is laterally collapsed by having the top and bottom walls of the individual cells pleated in folds outwardly from the partition walls (Figure 7) or inwardly (Figure 8). When expanded laterally, or inflated, the cross-section of a body extruded through the orifice 30 will assume the cross-section such as shown in Figure 2.

Figure 4:
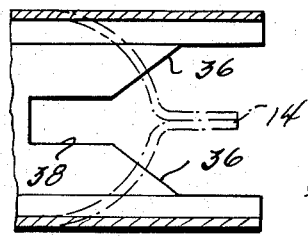
Figure 4 is a fragmentary vertical longitudinal sectional view of the end of an extruded float blank showing the method of cutting away a portion of the web end prior to closing the end of the float.

In making the float shown in Figure 1, a blank of desired length is cut from the above extruded piece by simply cutting it transversely as indicated in Figure 6. The blank is then expanded transversely and the top and bottom walls 20 and 22 are brought together at their ends and heat and pressure applied thereto to fuse them together. Preferably, before closing the ends of the envelope, the ends of the cell webs 18 are diagonally notched as at 36 in Figure 4 to facilitate closing the ends of the envelope. The notches 36 are longitudinally extended in the webs 18 as at 38 to enable air to pass readily between the several cells at both ends during inflation and deflation and also to permit the use of a single air filling valve such as is generally indicated at 40 (Figure 1).

A float such as shown in Figure 1, but somewhat larger in width and thickness than that made from a blank extruded through the nozzle shown in Figure 7, may be made from a blank extruded from a nozzle of substantially the same cross-sectional area but having an orifice of the shape shown in Figure 8.

As shown in Figure 8, the die 24a has an aperture 25a, one pair of opposite walls of which are corrugated to provide opposed pairs of grooves 26a in the manner described above. The intermediate grooves 26a are somewhat wider, however, than the grooves 26. The mandrel portion 28a, which forms with the aperture 25a an extrusion orifice 30a, has a juxtaposed series of spaced, H-shaped elements 32a the legs of which lie within the opposed grooves 26a.

It will be seen from the shape of the orifice 30a in Figure 8 that a blank extruded therefrom will likewise be in the form of a tubular body divided longitudinally into a single row of flattened juxtaposed cells by webs integrally joined with the top and bottom wall of the body. The partition or cell walls or webs in this case, however, are somewhat longer than those extruded through the orifice 30 and the top and bottom walls of the cells are pleated or infolded between the webs. This provides a somewhat larger circumferential dimension for the cells and a float made from this blank will consequently have a greater thickness and width than that previously described.

Figure 3:
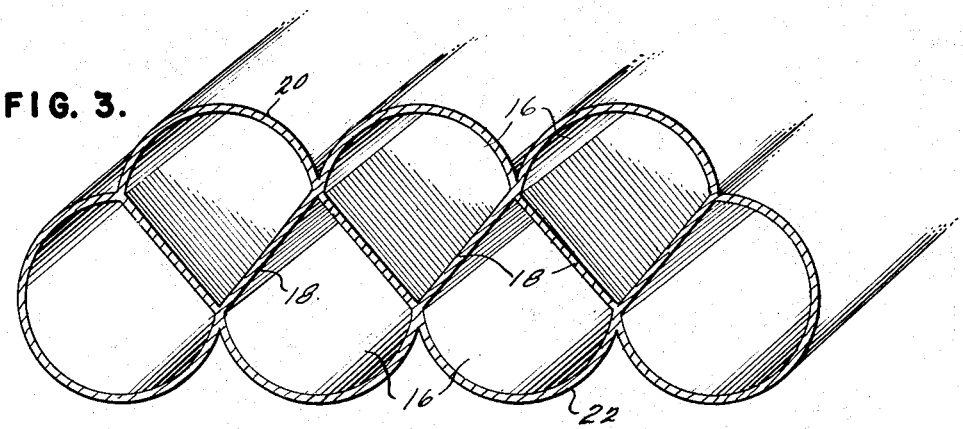
Figure 3 is a similar view of another embodiment of the invention.
Figure 9:
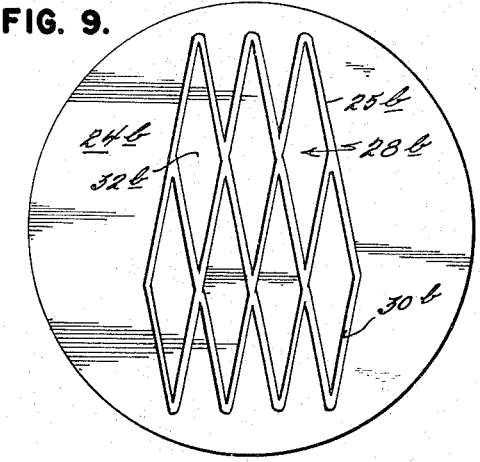
Figure 9 is a view similar to Figure 7 but showing a die for making a float having a cross-section shown in Figure 3.
Figure 10:
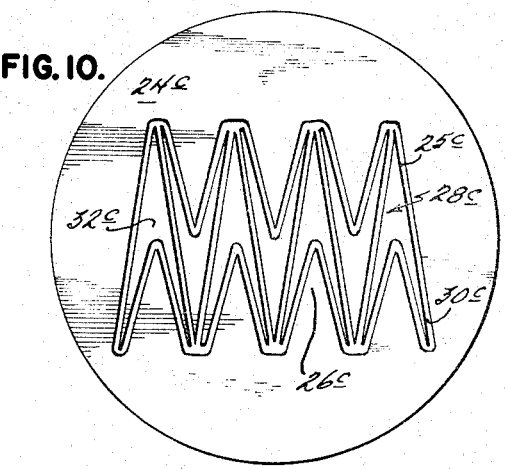
Figure 10 is a view similar to Figure 9 in which a die for fabricating a blank having modified dimensions is shown.

A blank having a cross-sectional cellular arrangement such as is shown in Figure 3, that is, having a double row of cells, the cells of one row being staggered with respect to the cells of the other row, may likewise be extruded through a die having the same cross-sectional area as the foregoing but having an extrusion orifice in the form of a diamond grid as shown in Figure 9, or in the form of a series of interconnecting V-shaped channels as shown in Figure 10.

As shown in Figure 9, the mandrel portion 28b is made with a double row of staggered and interfitting diamond-shaped elements 32b spaced apart from each other a distance equal to the desired web thickness of the float. The group of mandrel elements 32b fits within an aperture 25b in the die portion 24b of the extrusion nozzle, the diamond-shaped elements being spaced from the wall of the aperture a distance equal to the desired wall thickness of the float to form a diamond grid-like orifice 30b.

The blank, if extruded through this orifice 30b, will have a cross-sectional configuration like that of the orifice, that is, the tubular blank will consist of a double row of staggered, diamond-shaped cells, each cell having a common wall with the cell adjacent thereto.

In the nozzle shown in Figure 10, the mandrel portion 28c is formed with a group of V-shaped elements 32c, adjacent elements being inverted with respect to each other, and spaced from each other to provide the web forming passages of an extrusion orifice 30c. The die 24c has an aperture 25c, the top and bottom walls of which are formed with respectively staggered, V-shaped projections 26c. The sides of these projections 26c are spaced from the internal sides of the V-shaped mandrel elements 32c, and the end V-shaped mandrel elements are laterally spaced from opposite walls of the aperture 25c, a distance equal to the desired wall thickness of the blank to be extruded through the orifice 30c.

A blank extruded from either the orifice 30b or 30c will be transversely collapsed with the top and bottom walls pleated in accordion folds. In a blank extruded from the orifice 30b, the pleats will extend outwardly with respect to the cell walls, while in a blank extruded from the orifice 30c, the pleats will be infolded between the webs. When expanded, the cells of either blank will take the shape and arrangement shown in Figure 3.

Figure 5:
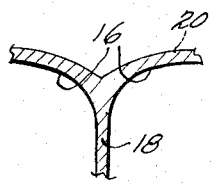
Figure 5 is a fragmental enlarged cross sectional view at the juncture of an outer and a partition wall of a float.

While the extrusion orifice in any of the foregoing dies is shown to comprise a continuous channel having a constant width and constant thickness of top and bottom walls and webs as shown in Figure 5, it is within the concept of this invention to differentially vary the width of the channel to provide any desired wall thickness gradient in the blank. For example, the thickness of the outer wall 20 which is subject to abrasion, may be made greater than the thickness of the cell partition or web 18. Also, if desired to eliminate concentration of stress at the juncture of the partition and outer walls, the extruded blank may be thickened at these points by accordingly enlarging the orifice channel.

The foregoing methods may be employed in the economical fabrication of a variety of productions, such as pneumatic floats, mattresses, cushions or other hollow bodies of generally rectangular, flat shape. The article produced is different from similar prior articles in construction, strength and appearance, being produced essentially from a single blank and being without joints or seams except a single joint or seam at each end of the article. The wall thicknesses may be easily controlled to produce desired thickness gradients in different parts of the article to provide for abrasion factors and the concentration of stresses without the addition of reinforcing material. Moreover, by means of the foregoing method of extruding tubular blanks in transversely collapsed condition, relatively wide, hollow articles may be extruded from a relatively small extrusion die.

It is to be understood that the forms of my invention herewith shown and described are to be taken as a preferred example of the same and that various changes in the shape, size and arrangement of parts may be resorted to without departure from the spirit of the invention or the scope of the subjoined claims.

I claim:

1. The method of forming inflatable floats or similar articles comprising extruding a flexible plastic material in a one-piece multi-cellular form having longitudinal partition walls forming cells, cutting the extruded form at a desired length, diagonally notching the partition walls adjacent their ends to facilitate sealing, extending the notches longitudinally of the partition walls and intermediate the transverse upper and lower edges to provide communication between the cells, and sealing the ends of the form to close it.

2. The method of forming inflatable floats or similar articles comprising extruding a flexible thermoplastic material in a one-piece tubular form having longitudinal partition walls forming cells, the opposed outer walls of each cell being folded upon themselves in longitudinally extending pleats to reduce the transverse cross-sectional area of the extruded form, cutting the extruded form at the desired length, diagonally notching the partition walls to facilitate sealing and longitudinally intermediate the transverse upper and lower edges to provide communication between the cells, and sealing the cut ends of the form to close it.

3. The method of forming inflatable floats or similar articles comprising extruding a flexible thermoplastic material in a one-piece tubular form having longitudinal partition walls forming cells, at least one outer wall of each cell being folded upon itself in longitudinally extending pleats to reduce the transverse cross-sectional area of the extruded form, cutting the extruded form at the desired length, notching the partition walls to facilitate sealing and to provide communication between the cells, and sealing the cut ends of the form to close it.

4. An inflatable float or similar article comprising a one piece extruded plastic material multi-cellular body, the longitudinal ends in the direction of extrusion being sealed and closing the body, the remainder of the body being seamless, the inner walls of the cells extending the full length of the cells and being diagonally notched to facilitate sealing and longitudinally notched adjacent the ends thereof intermediate of and spaced from the transverse edges of the web to provide communication between the cells.

5. An inflatable float as claimed in claim 4 said body including a plurality of longitudinal partition walls therein dividing the body into a double row of staggered diamond shaped cells, each cell having a common wall with the cell adjacent thereto.

6. An inflatable float as claimed in claim 5 wherein the junctures of the partition walls and outer walls are thickened with respect to the remainder of the material to eliminate concentration of stress at the juncture point.

References Cited in the file of this patent

UNITED STATES PATENTS

| | | |
|---|---|---|
| 1,671,642 | Hopkinson | May 29, 1928 |
| 1,744,130 | McChesney et al. | Jan. 21, 1930 |
| 2,064,128 | Smithers | Dec. 15, 1936 |
| 2,169,025 | Forbes | Aug. 8, 1939 |
| 2,262,086 | Barrow | Nov. 11, 1941 |
| 2,501,833 | Webb et al. | Mar. 28, 1950 |

FOREIGN PATENTS

| | | |
|---|---|---|
| 122,052 | Australia | Sept. 19, 1946 |
| 955,651 | France | Jan. 17, 1950 |